United States Patent
Bakhreiba et al.

(10) Patent No.: US 8,127,243 B2
(45) Date of Patent: Feb. 28, 2012

(54) UNINTERRUPTIBLE POWER SYSTEM (UPS) WITH IMPROVED MANUAL USER INTERFACE HAVING A TOUCH SCREEN WITH MAIN TABS SEPARATING PAGES, SUB-MENUS IDENTIFYING SUB-PAGES RELATED TO CERTAIN MAIN TABS, AND LINKS TO PAGES OR SUB-PAGES

(75) Inventors: Ali Bakhreiba, Houston, TX (US); Daniel Catina, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 779 days.

(21) Appl. No.: 11/954,015

(22) Filed: Dec. 11, 2007

(65) Prior Publication Data

US 2009/0150818 A1 Jun. 11, 2009

(51) Int. Cl.
G06F 3/048 (2006.01)
G06F 3/00 (2006.01)

(52) U.S. Cl. ......... 715/777; 715/779; 715/790; 715/794

(58) Field of Classification Search .................. 715/777, 715/779, 790, 794; 713/340; 705/412, 14.38
See application file for complete search history.

(56) References Cited

U.S. PATENT DOCUMENTS

| | | | | |
|---|---|---|---|---|
| 5,996,518 A | * | 12/1999 | Tomita | 112/470.01 |
| 6,601,181 B1 | * | 7/2003 | Thomas | 713/340 |
| 7,516,106 B2 | * | 4/2009 | Ehlers et al. | 705/412 |
| 2003/0160514 A1 | * | 8/2003 | Rajagopalan | 307/65 |
| 2008/0235872 A1 | * | 10/2008 | Newkirk et al. | 5/600 |
| 2009/0281891 A1 | * | 11/2009 | Walker et al. | 705/14.38 |
| 2010/0076333 A9 | * | 3/2010 | Burton et al. | 600/544 |

* cited by examiner

*Primary Examiner* — Nicholas Augustine
(74) *Attorney, Agent, or Firm* — Westerman, Hattori, Daniels & Adrian, LLP (57) ABSTRACT

An Uninterruptible Power System is described that is configured to operate as a buffer between a supplied power and an electrical load such that if line voltage is interrupted power to the load is maintained for a period of time. The uninterruptible power system is characterized in that it has a user interface that includes a touch screen having a display for presenting a graphical user interface and configured for manual user activation upon touching of said screen upon portions of the displayed graphical user interface, and a control module having programming configured to display a graphical user interface on the touch screen. In addition, the graphical user interface includes: a plurality of manually selectable tabs configured to present pages related to separate aspects of the uninterruptible power system; a menu configured to present sub-pages pertaining to respective ones of the tabs; wherein the tabs and the menu are located proximate a side of the touch screen; and at least one diagram including a plurality of regions having links to sub-pages pertaining to respective ones of the tabs.

2 Claims, 12 Drawing Sheets

UNINTERRUPTIBLE POWER SYSTEM (UPS) WITH IMPROVED MANUAL USER INTERFACE HAVING A TOUCH SCREEN WITH MAIN TABS SEPARATING PAGES, SUB-MENUS IDENTIFYING SUB-PAGES RELATED TO CERTAIN MAIN TABS, AND LINKS TO PAGES OR SUB-PAGES

BACKGROUND

An uninterruptible power supply, well known as a UPS, is typically used as a buffer between commercially supplied power and an electrical load, such as a computer, blood analyzer or other electronic equipment. If line voltage is interrupted, power to the load is maintained for a limited amount of time to operate the load during the interruption or to provide time to properly shut down the load without resulting damage. An on-line UPS typically comprises a converter, inverter, and battery charger. The UPS converts the commercially supplied AC power to DC power and then back to AC power. This conversion isolates the load equipment from spikes and sags in the commercially supplied power and corrects variances in line voltages. DC power is used to charge a battery. The battery can then be used to supply AC power to the load when the commercially supplied power is interrupted.

In commercial applications, loads may change over time. As computer networks are expanded the load on the UPS increases. In order to meet this increase in demand, either a larger UPS is needed or a plurality of modular UPS units can be connected together to meet the required power level.

Some illustrative UPS systems include those manufactured by the present assignee, Toshiba International Corporation, including, e.g., models which offer in tower design solutions. Some illustrative UPS designs are able to supply uninterrupted, clean single-phase power to systems while keeping batteries charged continuously, even if the utility power fails. Under normal operating conditions, the UPS's rectifier converts alternating current (AC power) to direct current (DC power), which is required for the system's inverter and battery charger. The charger supplies regulated DC power to keep the batteries constantly charged. The inverter uses pulse width modulation (PWM) that fully utilizes the characteristics of insulated-gate bipolar transistors (IGBT) to convert DC power to regulated AC power. Therefore there is a constant supply of power. The batteries will instantaneously supply the inverter DC power should an AC power line failure occur. AC input from the utility system is converted into DC power chopper. The stepped up DC power is then convened to AC power by the inverter. The output voltage waveform of the inverter will be the pulse voltage waveform modulated by the PWM control. The PWM-Modulated voltage waveform is transformed into a sine voltage waveform by the inductive component of the inverter inductor and by the capacitive component of the capacitor filter. The chopper, inverter and charger use the IGBT with a self-extinguishing function and a high switching speed. On the output there is an isolation transformer for extra power conditioning. In some examples, the UPS system employs the following Modes of Operation:

Emergency (Battery Backup)—In the event the AC power from the utility system fails, the DC power is supplied from the batteries to the chopper and to the inverter to provide a continued and stable AC power supply to the load without interruption.

Normal (Inverter)—The rectifier converts AC to DC to power the inverter, which supplies power to the critical load and simultaneously float charging the batteries.

Battery Charge—The charger will float charge the batteries while no load is being powered by normal mode.

Static Bypass—If the UPS unit is in severely overloaded or develops an internal faults, power is automatically switched from the units main circuit to the bypass circuit. Power is conditioned by line filters, and the isolation transformer during static bypass operation.

An illustrative UPS system includes status and control indicators, and includes a panel on the front for monitoring control of the UPS. In this regard, operation panel features include: 1) Run/Stop button; 2) AC input voltage indicator, 3) Inverter status indicator; 4) Alarm indicator; 5) Fault indicator; and a 6) Liquid Crystal Display (LCOD). The UPS has a LCD that displays operating conditions, warning messages and fault indication messages for the unit. In this regard, Operating Conditions Display can include e.g.: 1) Input voltage; 2) Output voltage, 3) Input frequency, 4) Output frequency; 5) Output current; 6) Battery voltage; 7) Battery test results; 8) Output voltage adjustment; 9) UPS ON/OFF Line. Moreover, Warning Messages can include, e.g.: 1) Overload; 2) Current limit 3) Emergency power off; 4) Battery discharge; 5) Battery Low-6) Input undervoltage; 7) Battery not good. Moreover, Fault Messages can include, e.g.: 1) DC undervoltage; 2) DC overcurrent; 3) DC overvoltage; 4) Overheat, 5) UPS overload; 6) Inverter undervoltage; and 7) Inverter overvoltage.

Figure 1:
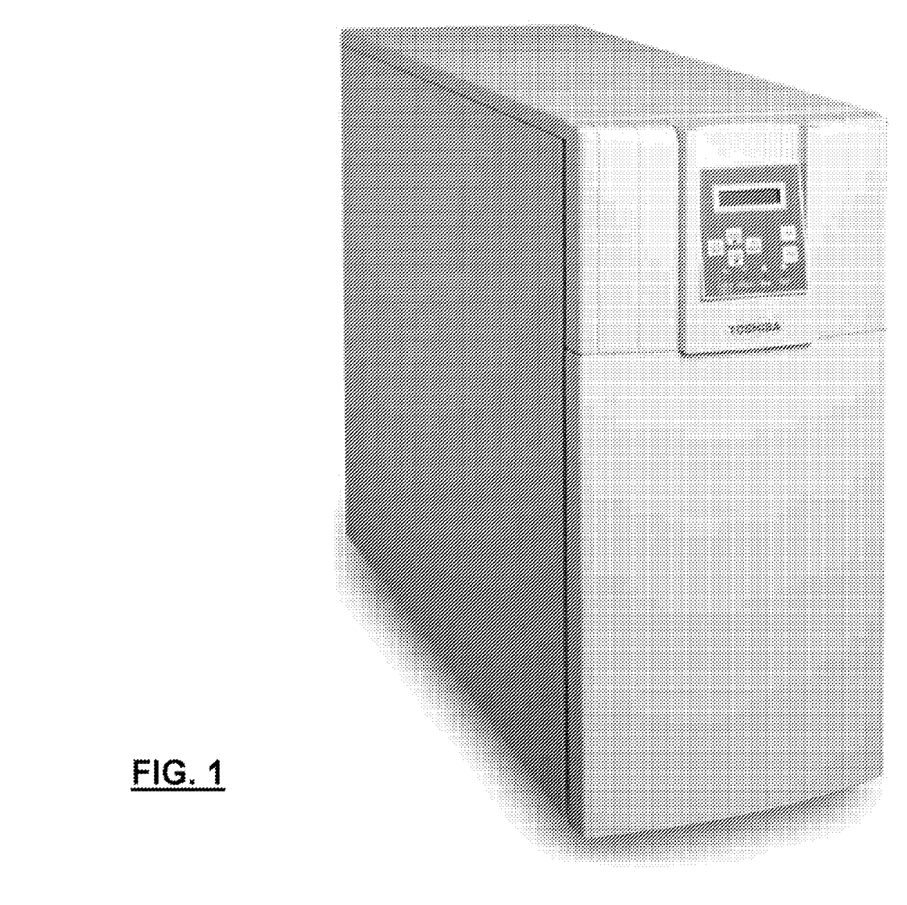
FIG. 1 is a perspective view of an illustrative background UPS device.

Although a variety of UPS systems are known in the art, there remains a need for improvements in relation to user management and use of such systems, including user operation of such systems via existing user interfaces. Some illustrative background UPS systems are shown in the following U.S. patents and applications of the present assignee (Toshiba International Corporation), the entire disclosures of which are incorporated herein by reference: U.S. Pat. No. 6,317,348; U.S. patent application Ser. No. 11/676,460; and U.S. patent application Ser. No. 11/737,427. By way of example, an illustrative background UPS device of the present assignee, Toshiba International Corporation is shown in FIG. 1.

SUMMARY

The preferred embodiments overcome the above and other problems in the art and provide substantial improvements in user operation of an Uninterruptible Power System due to a novel arrangement of features and functionality using a user interface having particular desirability in a UPS system.

In the preferred embodiments, a new implementation of the Human Machine Interface (HMI) for a UPS device includes a touch screen that includes a series of "pages" that can be accessed through tabs on the touch screen. Here, "tabs" referred to a plurality of proximate or adjacent navigation regions that can manually pressed (preferably with a single finger) to cause a new screen to be displayed. On the other hand, a "screen" refers to an image shown on the entire or a substantial portion of the entire monitor or display (i.e., thus, appearing as a new page in comparison to turning of pages in a book). In the preferred embodiments, the pages contain important or critical information about the UPS operation. In the preferred embodiments, the screen will also display the battery condition at all times. In the preferred embodiments, the screen will yet even further also display the load percentage at all times.

According to some examples, an Uninterruptible Power System is configured to operate as a buffer between a supplied power and an electrical load such that if line voltage is interrupted power to the load is maintained for a period of time, the uninterruptible power system being characterized in that it has a user interface comprising, a touch screen having a display for presenting a graphical user interface and configured for manual user activation upon touching of the screen upon portions of the displayed graphical user interface, a control module having programming configured to display a graphical user interface on the touch screen, the graphical user interface including: a plurality of manually selectable tabs configured to present pages related to separate aspects of the uninterruptible power system, a menu configured to present sub-pages pertaining to respective ones of the tabs, wherein the tabs and the menu are located proximate a side of the touch screen; and at least one diagram including a plurality of regions having links to sub-pages pertaining to respective ones of the tabs.

In some examples, the tabs include a tab for Status. In some examples, the tabs include a tab for Services. In some examples, the tabs include a tab for Logs. In some other examples, the touch screen is situated at an angle of between about 0 and 45 degrees from vertical to facilitate user operation. In preferred embodiments, the tabs are arranged side-by-side along a top region of the touch screen. In some examples, the touch screen also displays battery condition proximate the tabs and/or the touch screen also displays load percentage proximate the tabs. Preferably, the system also includes a plurality of LEDs proximate the touch screen including a warning LED.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION

According to some embodiments, an Uninterruptible Power System (UPS) display panel includes a casing (e.g., made of plastic or the like), a touch screen (e.g., including a manual touch screen interface) and light emitting diodes (LEDs). Among other things, the preferred embodiments, advantageously employs an improved, more user-friendly interface, including a touch screen/pad in a novel and unique manner. Among other things, the preferred embodiments, helps a user to easily browse software's menus through the graphical display.

In the preferred embodiments, a new implementation of the Human Machine Interface (HMI) for a UPS device includes a touch screen that includes a series of "pages" that can be accessed through tabs on the touch screen. Here, "tabs" referred to a plurality of proximate or adjacent navigation regions that can manually pressed (preferably with a single finger) to case a new screen to be displayed. On the other hand, a "screen" refers to an image shown on the entire or a substantial portion of the entire monitor or display (i.e., thus, appearing as a new page in comparison to turning of pages in a book). In the preferred embodiments, the pages contain important or critical information about the UPS operation. In the preferred embodiments, the screen will also display the battery condition at all times (see, e.g., the illustrative representation of the battery time in FIG. 3(A) of 146 minutes). In the preferred embodiments, the screen will yet even further also display the load percentage at all times (see, e.g., the illustrative representation of the load percentage of 61% in FIG. 3(A)).

Figure 2A:
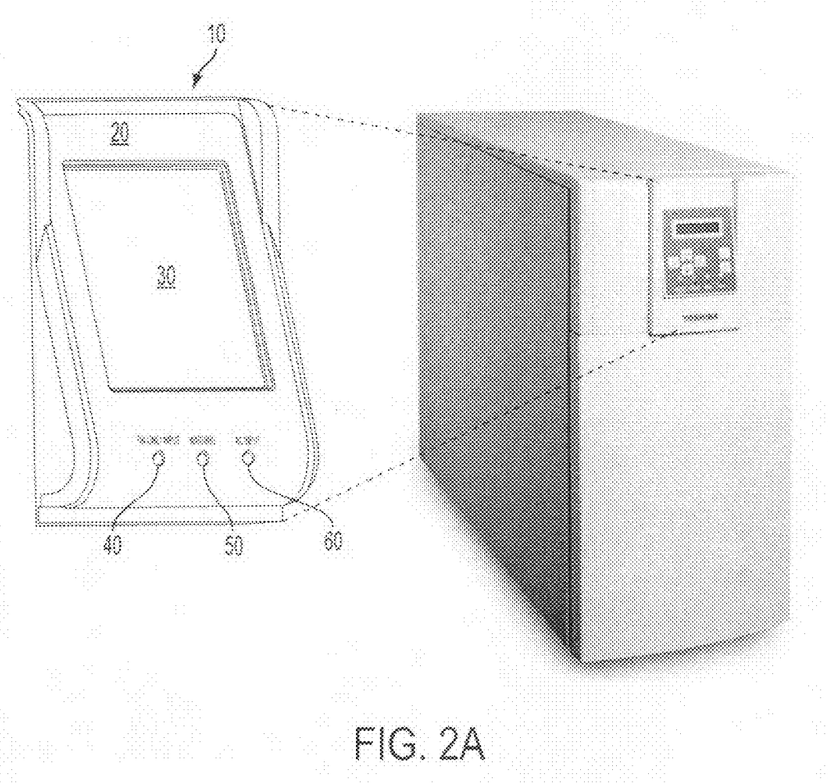
FIG. 2(A) is a perspective view depicting how a UPS device similar to that shown in FIG. 1, by way of example, can be upgraded to include an improved interface according to preferred embodiments of the present invention.

In the preferred embodiments, a navigation system is provided to facilitate movement between informational pages. In the preferred embodiments, the navigation system will include a pull down menu for each tab so that the sub-pages can be easily accessed. In some preferred embodiments, the pages can also include "buttons" that either a) link a page to a sub-page or b) initiate the performance of a particular UPS operation In the preferred embodiments, the display angle is set to the best viewing angle for the user to enable the user to readily use the touch screen without changing position. For reference, FIG. 2(A) shows the display angle at a moderately inclined angle of between about 0 and 45 degrees. In some preferred embodiments, the angle can be the same as shown in any of the figures, with such angle being shown to scale as an illustrative and non-limiting example.

In the preferred embodiments, the display is supported within an enclosure and includes a manually operated touch screen and a control circuit board that is driven by embedded software. In preferred embodiments, the system can include a processor or computer elements to facilitate programming and operation. In the preferred embodiments, the touch screen display improves and simplifies the user interface to UPS units. In the preferred embodiments, the screen is set in a convenient user viewing angle so that a user does not need to change position or sit down to operate the unit.

In some preferred embodiments, a display screen is secured with hardware inside a housing at a desired viewing angle, such as, e.g., shown at the left side of FIG. 2(A). Preferably, the display screen displays manually touchable browsers/menu navigation interfaces with the control circuit board via software. In the preferred embodiments, the display screen hardware is secured to the UPS unit in such a manner to accommodate ready upgrades in, e.g., software, modules and/or components.

As described above, current UPSs are typically operated by using a keypad located near a character display, and important information is relayed through front-mounted LEDs—e.g., a 2 Line character display and a built-in keypad. On the other hand, according to the preferred embodiments, by using a graphical display and touch screen an infinite number of possibilities can be provided for the interface. Among other things, the preferred embodiments enable helpful graphical displays, and advantageous UPS status operation/animation.

According to the preferred embodiments, a new graphical method is employed that includes three (3) ways of accessing information that a user needs in relation to the UPS device. These three ways include: 1) main tabs that present separate screens (which tabs are preferably present along a portion of every screen (e.g., at a top thereof), 2) a pull-down menu that provides access to sub-pages (which menu is preferably related to a particular tab so as to present sub-pages to such tab), and link buttons that provide access to sub-pages or the like.

In the preferred embodiments, the Main Tabs include Tabs that separate main categories of UPS data. In the preferred embodiments these tabs contain pages with different kinds of information that the user will need for different operations.

In the preferred embodiments, the Pull-down Menus are configured such that each of the Main Tabs contains a series of sub-pages that can be accessed by a respective pull-down menu.

In the preferred embodiments, the Link Buttons are provided on pages or sub-pages such that the pages or sub-pages will be able to contain buttons that will allow the user to link to other pages containing more detailed information.

Among other things, having these three ways to access important data provides for a more intuitive interface so that a user can start operating the UPS without having to follow a guideline/manual. In addition, this arrangement also greatly helps to reduce user-created error due to, for example, the separation of data that might have adverse results if changed simultaneously.

FIG. 2(A) is a perspective view depicting how a UPS device similar to that shown in FIG. 1, by way of example, can be upgraded to include an improved user interface 10 according to preferred embodiments of the present invention. As shown, the interface 10 includes a frame 20, and a touch screen 30 (i.e., employing known elements so as to enable a user to physically touch a portion of the screen in order to activate, e.g., computer-driven functions), as well as LEDS 40 (re: Online/Fault), 50 (re: Warning) and 60 (re: AC input). In some preferred embodiments, the touch screen is sized to conveniently present portions shown in the figures in a manner to be readily viewed and readily manipulated by one's fingers. In some preferred embodiments, the screen 30 can have a generally rectangular configuration as shown with a height of about 11 inches and a width of about 8 inches, similar to a common sheet of paper. In other more practical embodiments, the screen 30 can have a smaller size, such as, e.g., of about 6 by 8 inches. In other embodiments, the screen 30 can have a smaller size, such as, e.g., of about 4 by 6 inches. In other embodiments, the screen 30 can have a smaller size, such as, e.g., of about 3 by 5 inches. While the size can vary, preferably the size is sufficient to enable users to manipulate assorted screens as shown in the accompanying figures and can be varied as desired based on circumstances. In preferred embodiments, the screen 30 has a total area of more than 10 square inches, and, more preferably, more than 12 square inches, and, more preferably, more than 15 square inches, and, more preferably, more than 16 square inches, and, more preferably, more than 20 square inches and, more preferably, more than 24 square inches.

Figure 3A:
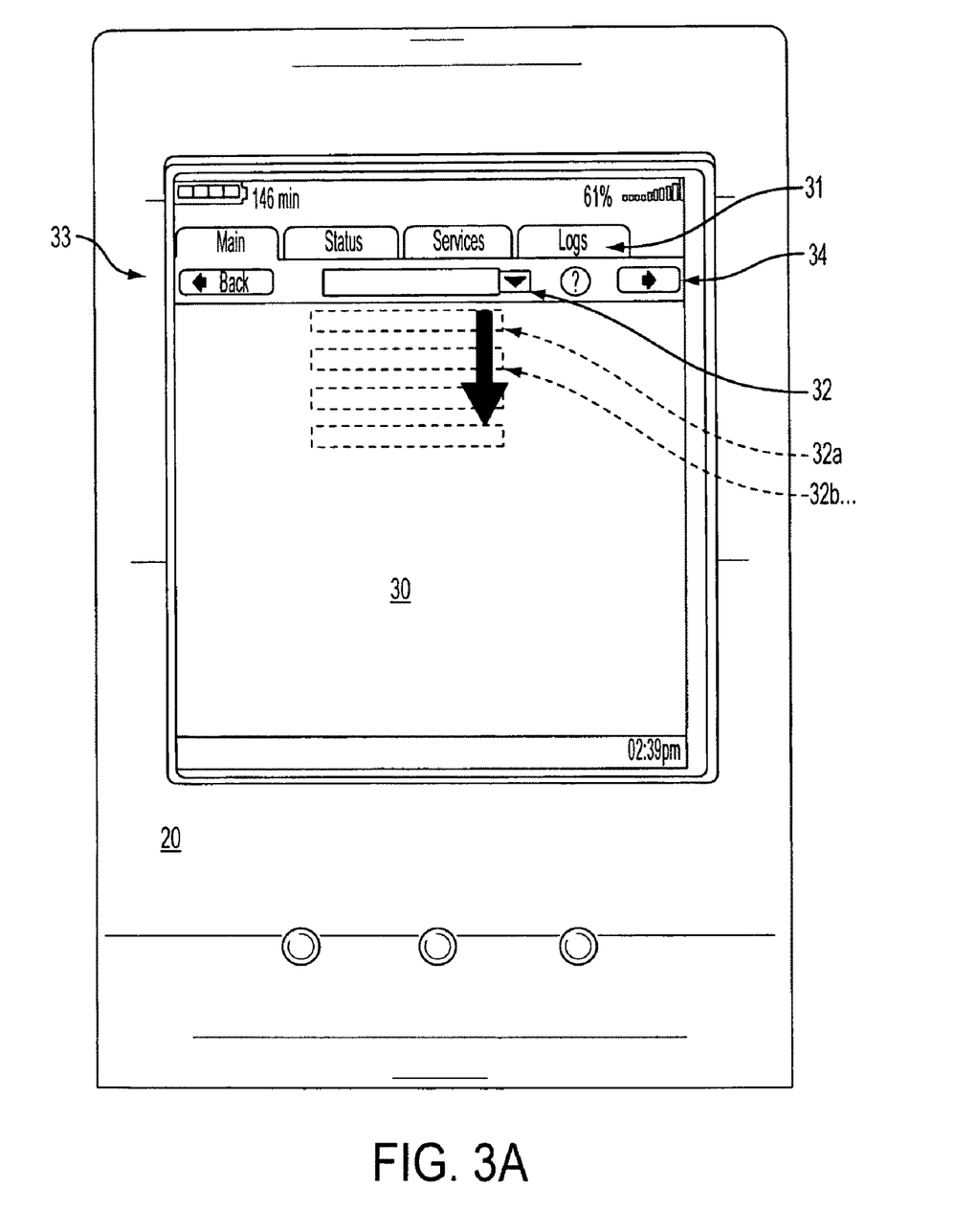
FIG. 3(A) is an illustrative front view of an illustrative interface according to the preferred embodiments, including a plurality of user manipulated tabs.

FIG. 3(A) is an illustrative front view of an illustrative interface 10 according to the preferred embodiments, including a touch screen configured to display a plurality of user manipulated tabs 31, and including a menu selection region 32 configured to enable a menu-type selection of sub-pages. As shown, a menu can be presented by pressing or clicking the menu region, or the arrow at the right of the menu region, such as, e.g., to cause the software to present a drop-down list (see, e.g., illustrative boxes 32a, 32b . . . ) shown in FIG. 3(A) representing items within the menu according to some examples. As shown in FIG. 3(A), the display can also include back button 33 and forward button 34, which buttons can, e.g., in some instances operate so as to move backward and/or forward between main pages (or tabs), sub-pages or to return through items selected similar to common browser software back and forward functions used in common Internet browsing, such as, e.g., INTERNET EXPLORER, FIREFOX, etc.

Figure 3B:
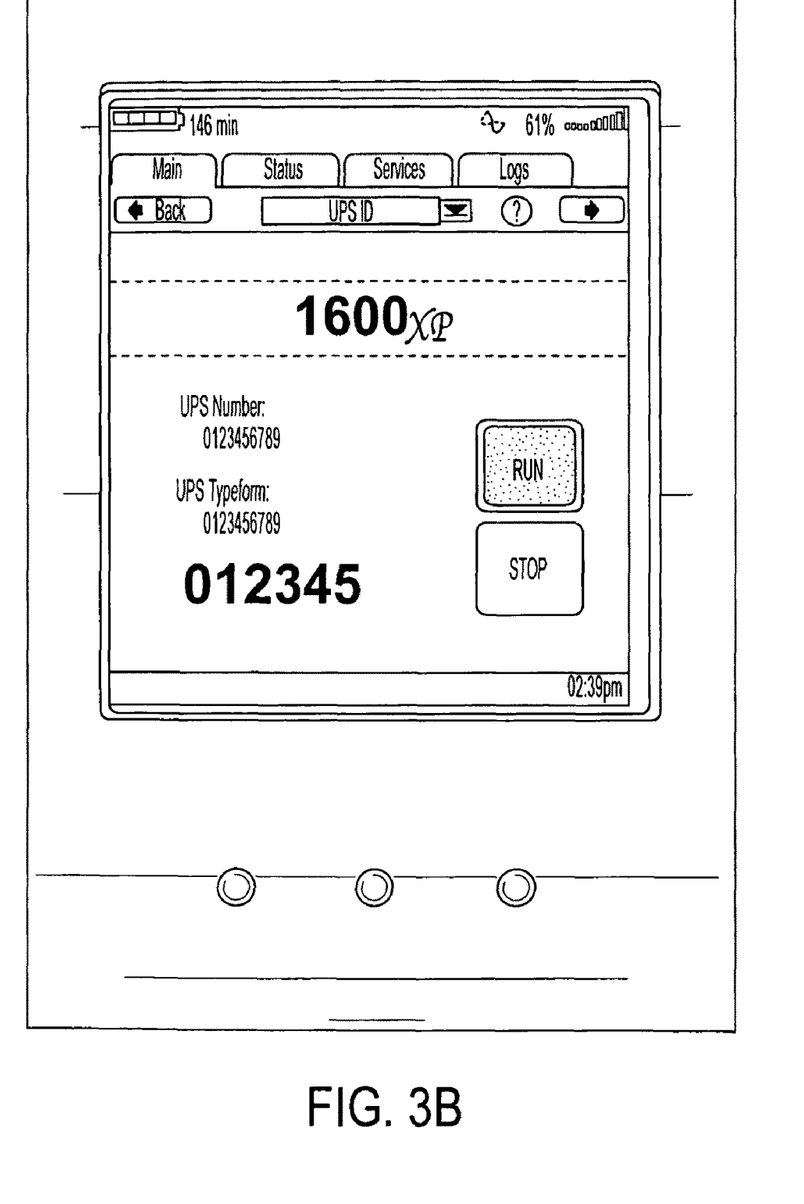
FIG. 3(B) is a another illustrative front view of an illustrative interface according to the preferred embodiments, including a plurality of user manipulated tabs, as well as some additional information and links displayed.

FIG. 3(B) is another illustrative front view of an illustrative interface according to the preferred embodiments which is similar to that shown in FIG. 3(A), but which also includes additional information (e.g. UPS Number and UPS Typeform, along with Links for, e.g., RUN and STOP operation.

Figure 3C:
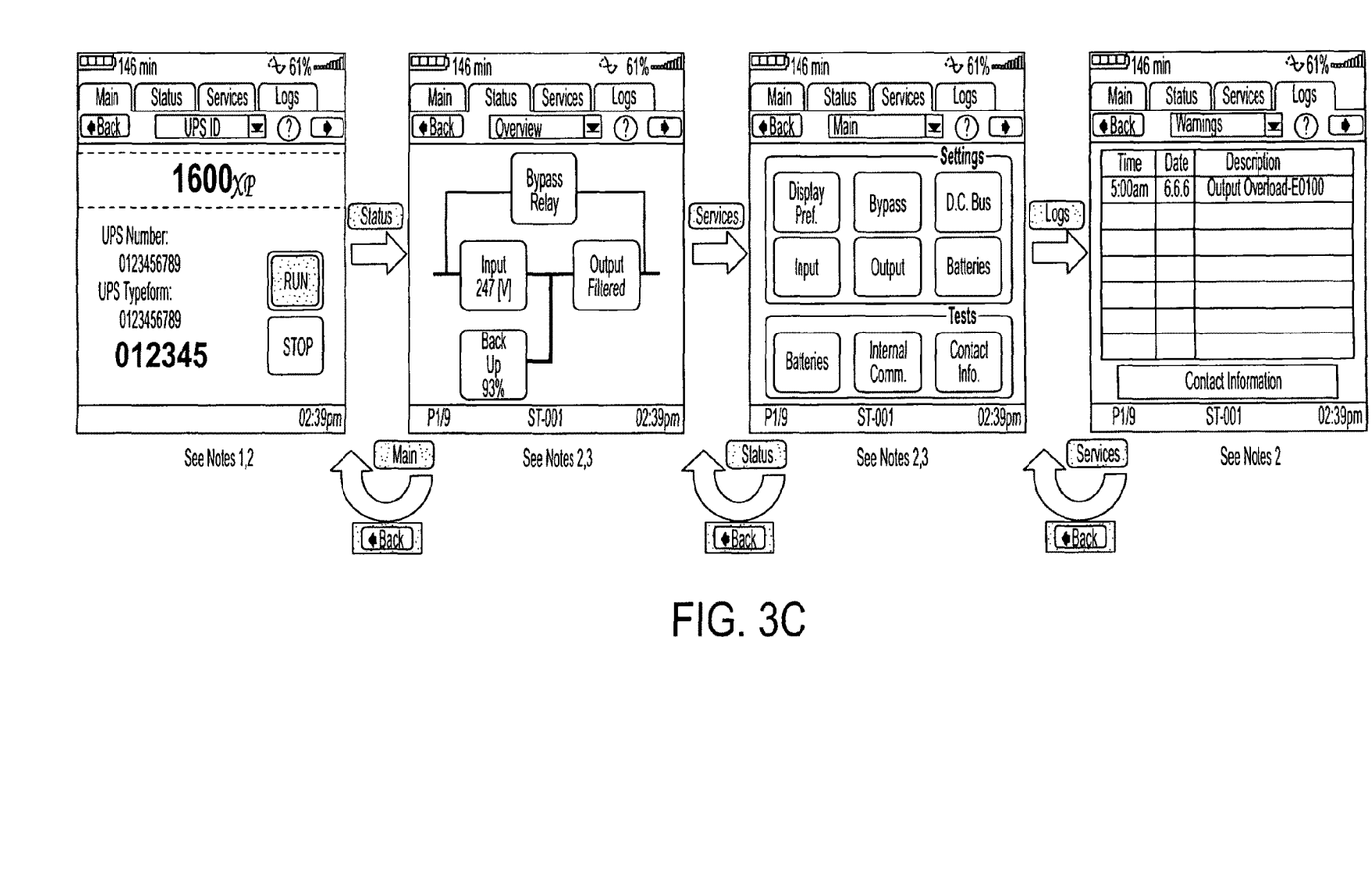
FIG. 3(C) is an explanatory flow diagram depicting flows between screens according to some preferred embodiments of the UPS user interface.

FIG. 3(C) is an explanatory flow diagram depicting flows between screens according to some preferred embodiments of the UPS user interface. As shown in this illustrative example, a user can move between tabs by physically selecting tab regions on the touch screen (e.g., manually touching such regions), and can go backward or forward using the back button (or forward button) regions as schematically shown.

Figure 4A:
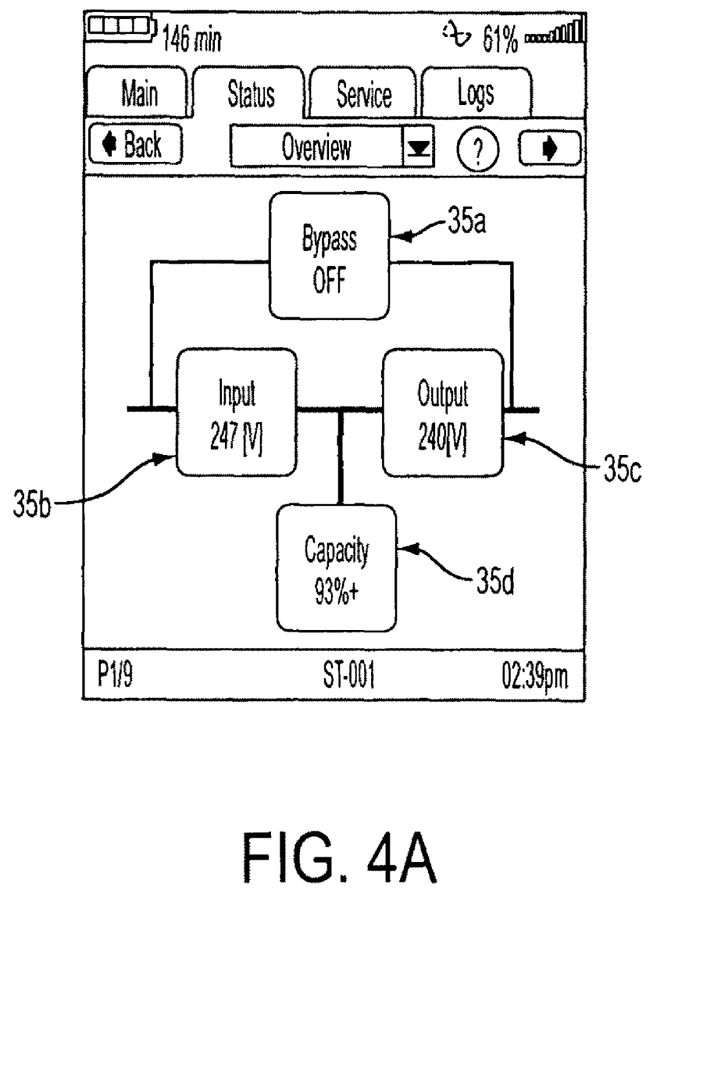
FIG. 4(A) is an illustrative overview page diagram related to a Status Tab according to some illustrative embodiments.

FIG. 4(A) is an illustrative overview page diagram related to a Status Tab according to some illustrative embodiments. As shown, the page can include a menu (e.g., a drop-down or other type of menu as known in the art) to provide easy access to sub-pages, and can include a diagram having links (see, e.g., link regions 35a, 35b, 35c, 35d) to sub-pages. In some embodiments, the menu and the links can be used to access the same or similar pages in duplicative manners. In some embodiments, the links 35a to 35d can be used to present sub-pages similar to that shown in FIGS. 4(B) to 4(E), and, in some embodiments, the menu 32 can be used to present sub-pages similar to that shown in FIGS. 4(B) to 4(E).

Figure 4B:
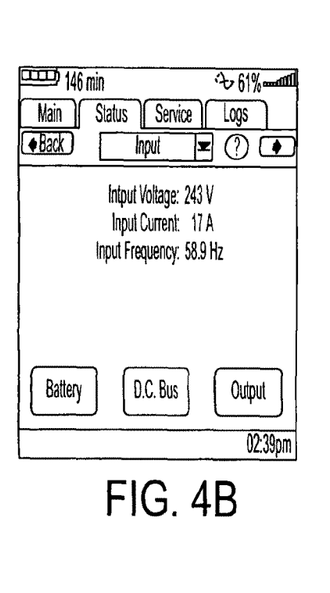
FIGS. 4(B) to 4(E) are illustrative sub-pages shown in conjunction with separate menu selections for "input" (FIG. 4(B)) "output" (FIG. 4(C)) "battery" (FIG. 4(D)) and "D.C. Bus" (FIG. 4(E))
Figure 4C:
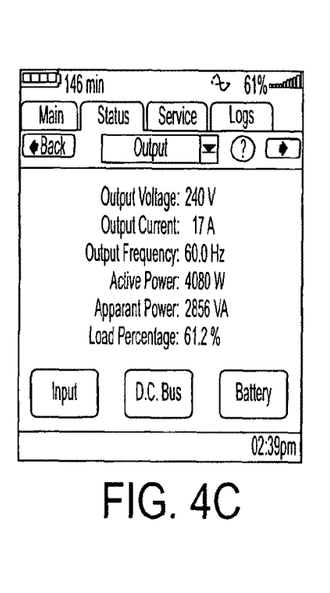
Figure 4D:
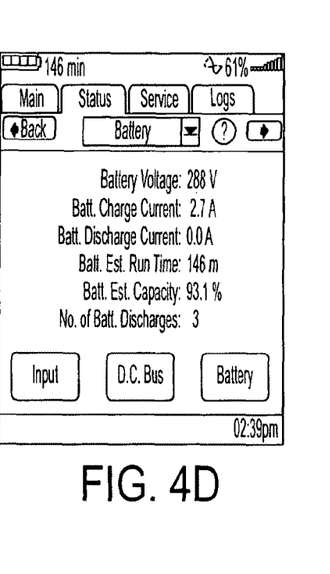
Figure 4E:
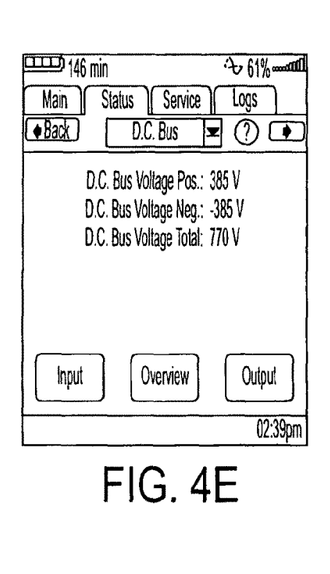
Figure 5A:
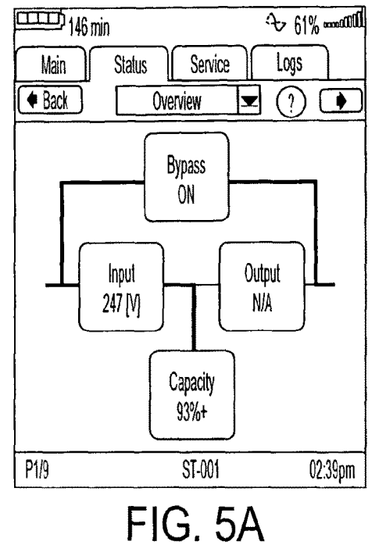
FIGS. 5(A) to 5(D) show additional illustrative overview page diagrams related to a Status Tab according to some illustrative embodiments.
Figure 5B:
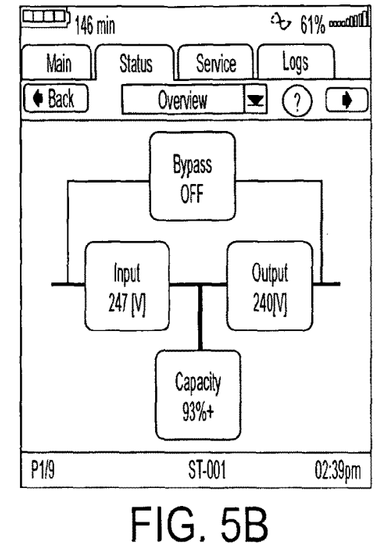
Figure 5C:
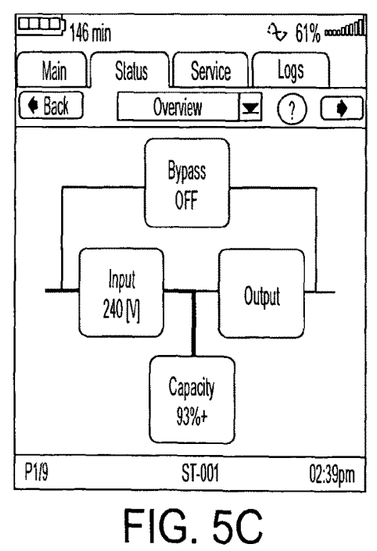
Figure 5D:
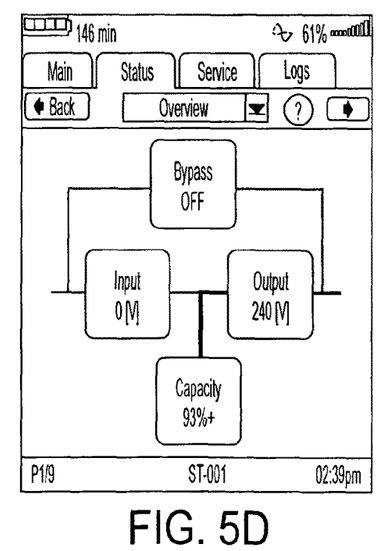

In this regard, FIGS. 4(B) to 4(E) are illustrative sub-pages shown in conjunction with separate menu selections for "input" (FIG. 4(B)), "output" (FIG. 4(C)), "battery" (FIG. 4(D)) and "D.C. Bus" (FIG. 4(E)).

For reference, FIGS. 5(A) to 5(D) show additional illustrative overview page diagrams related to a Status Tab according to some illustrative embodiments. As shown, the heavy lines are used to show aspects in an on mode.

Figure 6A:
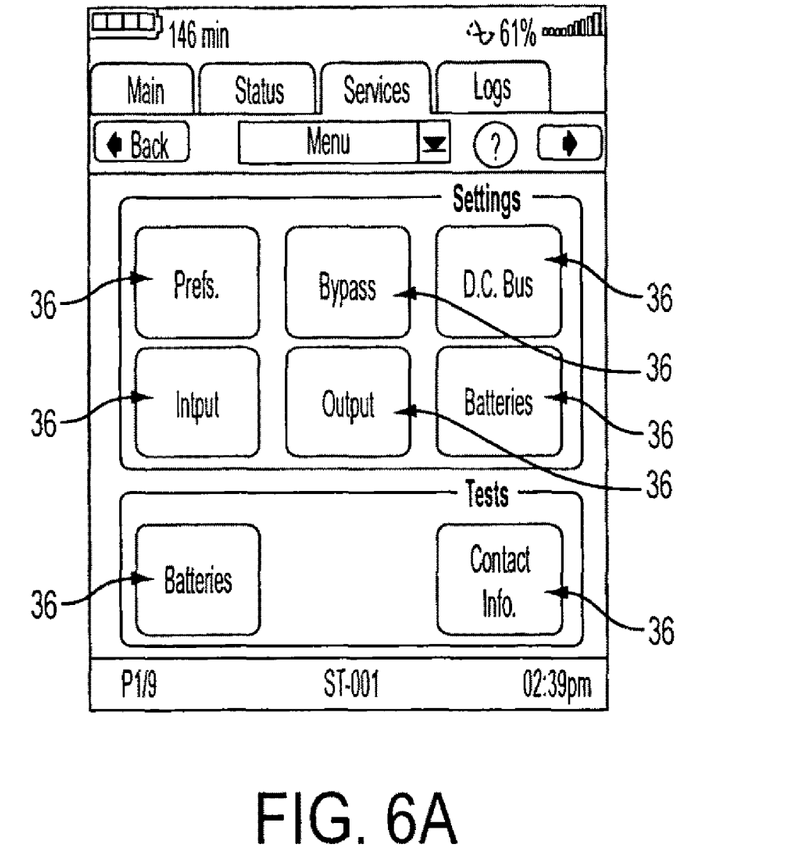
FIG. 6(A) is an illustrative overview page diagram showing settings related to a Service Tab according to some illustrative embodiments.

For additional reference, FIG. 6(A) is an illustrative overview page diagram showing settings related to a Service Tab according to some illustrative embodiments. As in the example above, this page can include a diagram including links 36, with each link providing access to a different portion or other information or sub-page, such as, e.g., some or all of sub-pages 6(C) to 6(J).

Figure 6B:
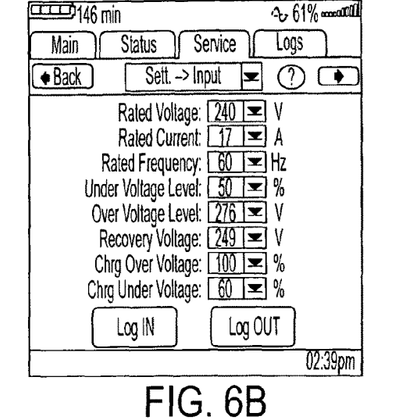
FIGS. 6(B) to 6(J) are illustrative sub-pages shown in conjunction with separate menu selections for "input" (FIG. 6(B)) "bypass" (FIG. 6(C)), "output" (FIG. 6(D)), "battery" (FIG. 6(E)), "D.C. Bus" (FIG. 6(F)), "Contact Info" (FIG. 6(G)), and "Preferences" (FIG. 6(H)-6(J))
Figure 6C:
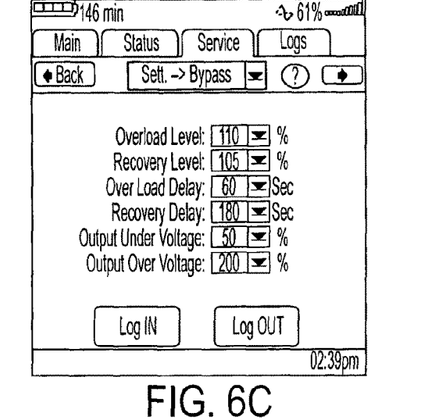
Figure 6D:
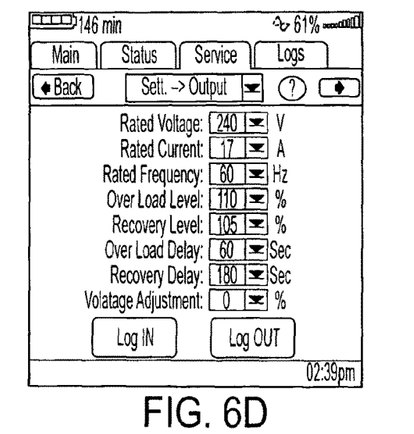
Figure 6E:
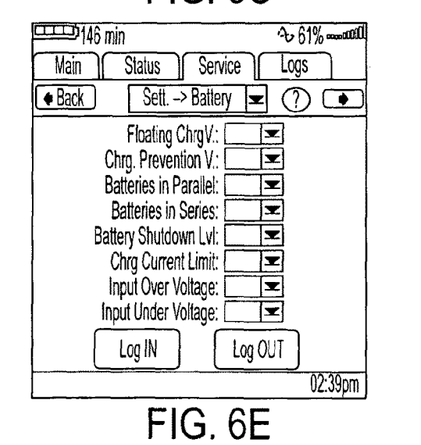
Figure 6F:
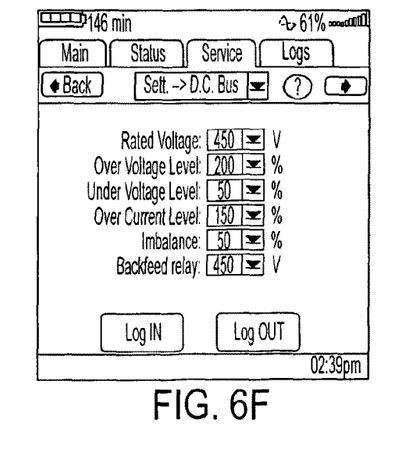
Figure 6G:
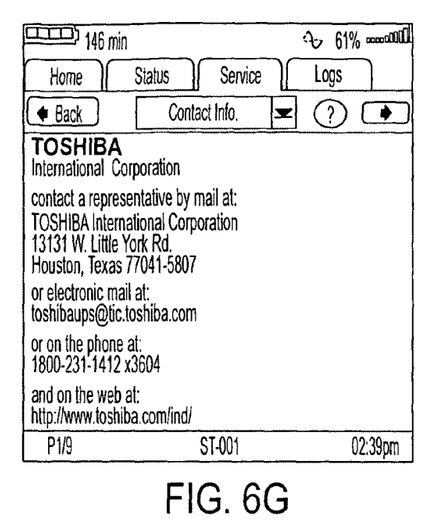
Figure 6H:
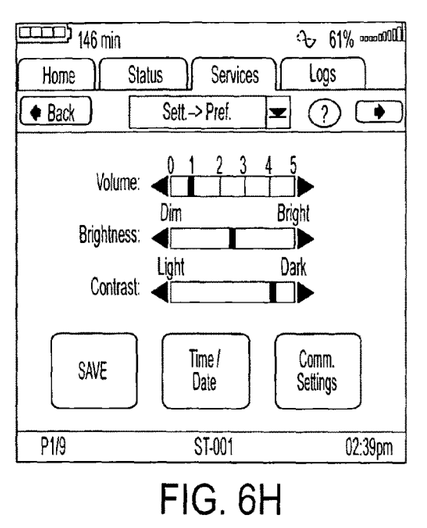
Figure 6I:
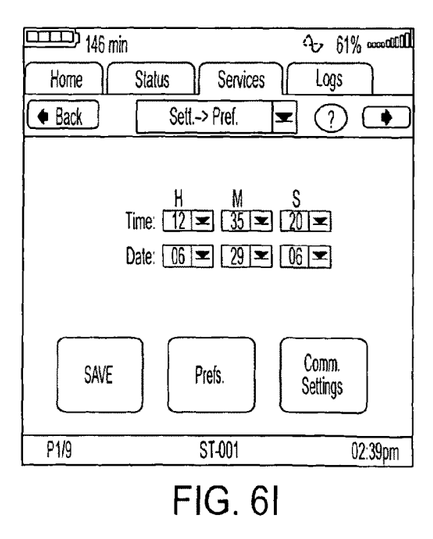
Figure 6J:
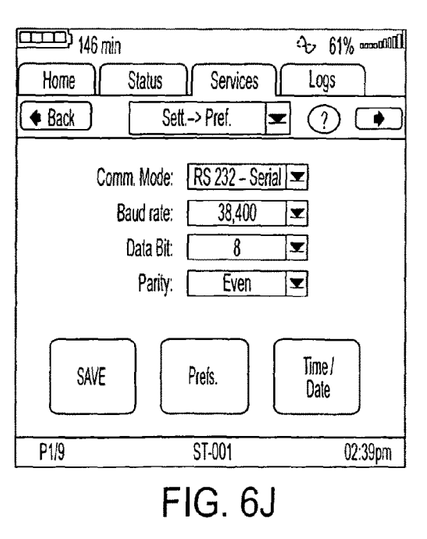

In this regard, FIGS. 6(B) to 6(J) are illustrative sub-pages shown in conjunction with separate menu selections for "input" (FIG. 6(B)), "bypass" (FIG. 6(C)), "output" (FIG. 6(D)), "battery" (FIG. 6(E)), "D.C. Bus" (FIG. 6(F)), "Contact Info" (FIG. 6(G)), and "Preferences" (FIG. 6(H)-6(J)).

Figure 7A:
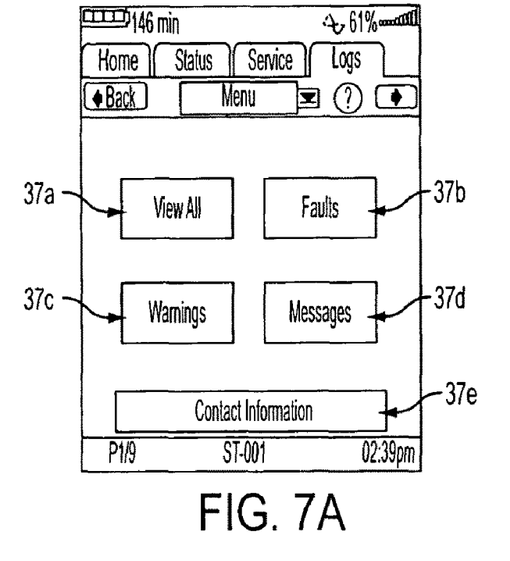
FIG. 7(A) is an illustrative overview page diagram showing settings related to a Logs Tab according to some illustrative embodiments.

For reference, FIG. 7(A) is an illustrative overview page diagram showing settings related to a Logs Tab according to some illustrative embodiment. As in the examples above, this page can include a diagram including links 37a to 37e, by way of example, with each link providing access to a different portion or other information or sub-page. As one illustrative example, a link 37c could provide access to a sub-page shown in FIG. 7(B).

Figure 7B:
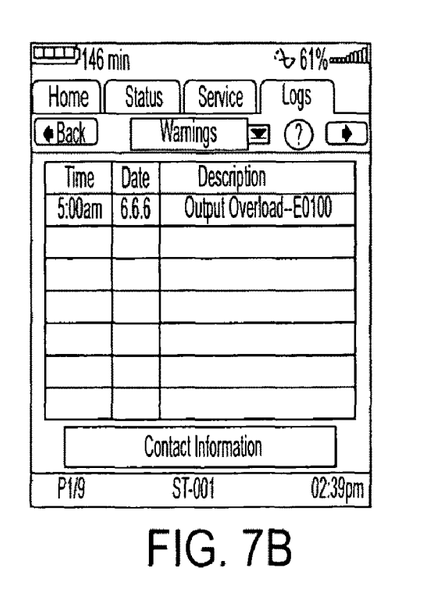
FIG. 7(B) is an illustrative Warnings sub-page diagram showing settings related to a Logs Tab according to some illustrative embodiments.

In this regard, FIG. 7(B) is an illustrative Warnings sub-page diagram showing settings related to a Logs Tab according to some illustrative embodiments.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. In the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e. it should be understood that the present invention has a number of aspects and embodiments), and should not be improperly interpreted as limiting the scope of the application or claims.

What is claimed is:

1. An uninterruptible power system (UPS) configured to operate as a buffer between a supplied power and an electrical load such that if line voltage is interrupted power to the load is maintained for a period of time, said uninterruptible power system being characterized in that it has a user interface comprising:
   a) a touch screen having a display for presenting a graphical user interface and configured for manual user activation upon touching portions of said screen corresponding to the displayed graphical user interface;
   b) a control module having programming configured to display the graphical user interface on said touch screen, said graphical user interface including:
      a plurality of manually selectable tabs configured to present pages related to separate aspects of said uninterruptible power system;
      a manually selectable menu configured to present sub-pages pertaining to respective ones of said tabs;
      wherein said tabs and said menu are located proximate a side of said touch screen;
      wherein said tabs include a tab for Status having at least one diagram including a plurality of regions having links to sub pages pertaining to Status information;
      wherein said tabs include a tab for Services having at least one diagram including a plurality of regions having links to sub pages pertaining to Services information;
      wherein said tabs include a tab for Logs having at least one diagram including a plurality of regions having links to sub pages pertaining to Logs information;
   c) wherein said touch screen is mounted on front surface of an enclosure of the uninterruptible power system and is situated at an angle of between about 0 and 45 degrees from vertical to facilitate user operation;
      wherein said tabs are arranged side-by-side along a top region of the touch screen;
      wherein said touch screen also displays battery condition proximate said tabs;
   wherein said touch screen also displays load percentage proximate said tabs;
      further including a plurality of LEDs proximate said touch screen, including a warning LED, an online/fault LED and an AC input LED; and
      wherein said touch screen has an area of at least 10 square inches.

2. A method comprising: having a user operate the Uninterruptible Power System of claim 1 by manually touching said touch screen.

* * * * *